United States Patent
Umlauft et al.

(10) Patent No.: US 9,487,294 B2
(45) Date of Patent: Nov. 8, 2016

(54) SUPPLY SYSTEM FOR SUPPLYING PASSENGERS IN A PASSENGER COMPARTMENT OF A VEHICLE

(71) Applicant: AIRBUS OPERATIONS GMBH, Hamburg (DE)

(72) Inventors: Sebastian Umlauft, Hamburg (DE); Ralf Koblitz, Hamburg (DE); Niklas Halfmann, Hamburg (DE); Dieter Krause, Buchholz (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 976 days.

(21) Appl. No.: 13/660,769

(22) Filed: Oct. 25, 2012

(65) Prior Publication Data
US 2013/0105638 A1 May 2, 2013

Related U.S. Application Data

(63) Continuation of application No. PCT/EP2011/001986, filed on Apr. 19, 2011.

(60) Provisional application No. 61/328,777, filed on Apr. 28, 2010.

(51) Int. Cl.
*B64D 11/00* (2006.01)
*B64D 13/00* (2006.01)
*F24F 13/02* (2006.01)

(52) U.S. Cl.
CPC ............... *B64D 11/00* (2013.01); *B64D 13/00* (2013.01); *F24F 13/0209* (2013.01)

(58) Field of Classification Search
CPC ................................ B64D 11/00; B64D 13/00
USPC ............................................................ 454/76
See application file for complete search history.

(56) References Cited

U.S. PATENT DOCUMENTS 3,748,998 A * 7/1973 Lambert ..................... 454/301
4,703,685 A * 11/1987 Meckler ..................... 454/263
(Continued)

FOREIGN PATENT DOCUMENTS

DE 43 03 681 8/1994
DE 10 2007 014 406 4/2008
(Continued)

OTHER PUBLICATIONS

International Search Report dated Oct. 19, 2011.

*Primary Examiner* — Steven B McAllister
*Assistant Examiner* — Frances F Hamilton
(74) *Attorney, Agent, or Firm* — Dickinson Wright PLLC

(57) ABSTRACT

A supply system for supplying passengers in a passenger compartment of a vehicle, in particular an aircraft, includes a supply line and a number of supply modules which, for supplying the passengers, are connectable to the supply line. The supply modules are displaceable relative to one another along the supply line, the supply line having one or a plurality of supply openings by which the connection between the supply line and the supply modules can be established, each supply module furthermore being assigned at least one screen which is arranged in such a manner on the service supply line that it is displaceable along the supply line and can cover a part of the one supply opening or of the plurality of supply openings which is not used for the connection of a supply module to the supply line.

13 Claims, 8 Drawing Sheets

(56) References Cited

U.S. PATENT DOCUMENTS

Figure 4:
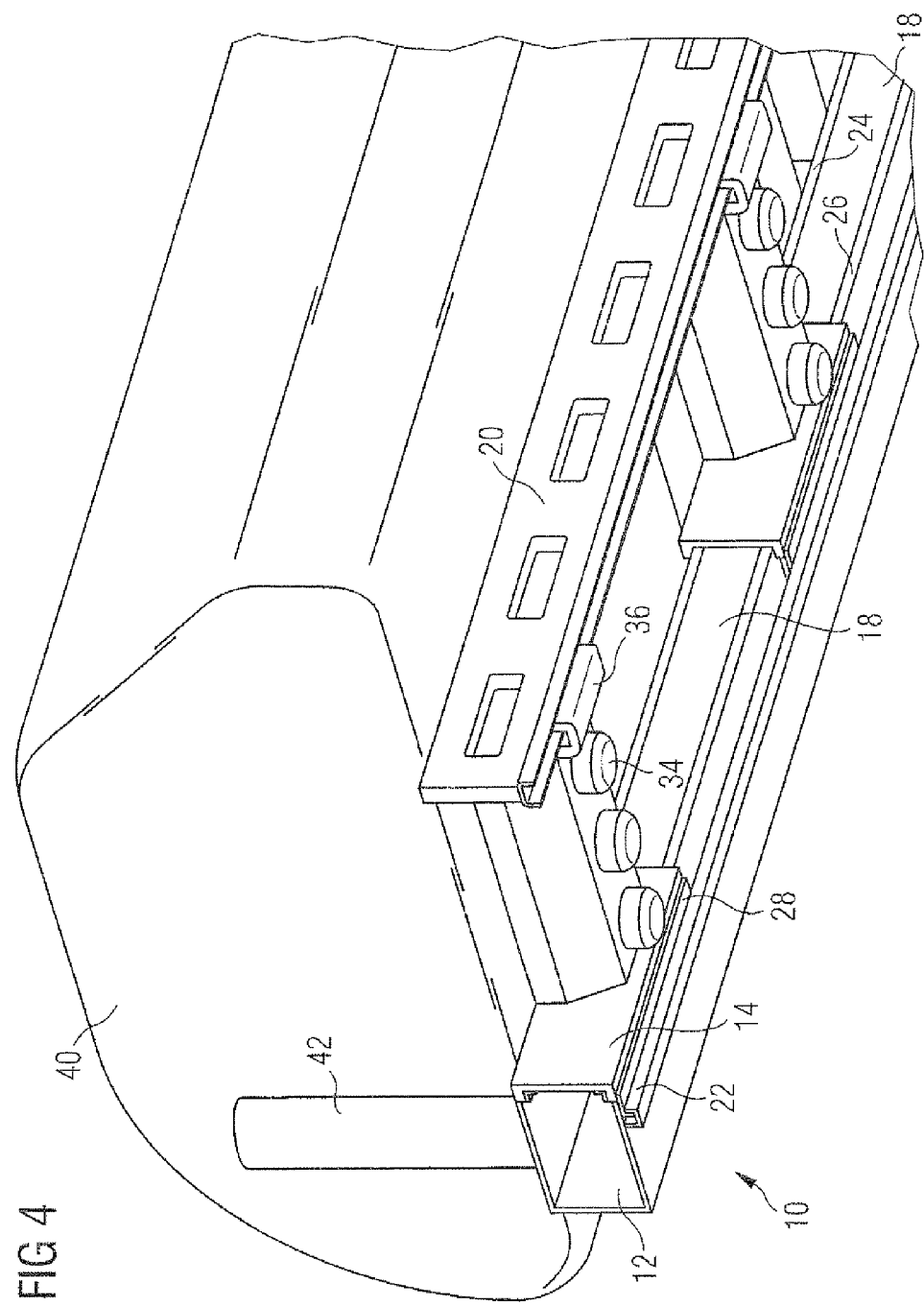

| | | | |
|---|---|---|---|
| 5,556,332 A * | 9/1996 | Schumacher | 454/76 |
| 5,642,729 A | 7/1997 | Cassidy | |
| 5,707,028 A | 1/1998 | Roeper | |
| 5,816,244 A * | 10/1998 | Aulgur | B64D 11/00 128/202.26 |
| 7,052,068 B2 * | 5/2006 | Sturt et al. | 296/37.7 |
| 8,262,023 B2 * | 9/2012 | Kofinger et al. | 244/119 |
| 8,454,415 B2 * | 6/2013 | Nitsche et al. | 454/76 |
| 9,067,678 B2 | 6/2015 | Edom et al. | |
| 2008/0268762 A1 * | 10/2008 | Bruggen et al. | 454/76 |
| 2009/0275277 A1 * | 11/2009 | Al-Alusi et al. | 454/76 |
| 2009/0298408 A1 | 12/2009 | Reisbach | |
| 2010/0087130 A1 | 4/2010 | Nitsche | |
| 2010/0124875 A1 * | 5/2010 | Stevens et al. | 454/76 |
| 2011/0146686 A1 | 6/2011 | Schneider | |
| 2011/0147520 A1 * | 6/2011 | Schneider | 244/118.5 |
| 2011/0240796 A1 * | 10/2011 | Schneider | 244/118.5 |
| 2011/0240798 A1 * | 10/2011 | Gershzohn | G08B 17/00 244/129.2 |
| 2011/0294409 A1 | 12/2011 | Edom | |
| 2012/0032027 A1 | 2/2012 | Gehm | |
| 2012/0074258 A1 * | 3/2012 | Papke et al. | 244/118.5 |
| 2013/0005231 A1 * | 1/2013 | Schneider et al. | 454/76 |
| 2013/0149950 A1 * | 6/2013 | Umlauft et al. | 454/76 |
| 2015/0090839 A1 * | 4/2015 | Freund | B64D 11/0015 244/118.5 |
| 2015/0097082 A1 * | 4/2015 | Paulino | B64D 13/00 244/118.5 |

FOREIGN PATENT DOCUMENTS

| | | |
|---|---|---|
| DE | 10 2008 028 258 | 12/2009 |
| DE | 10 2008 050 546 | 4/2010 |
| DE | 10 2009 018 111 | 10/2010 |

* cited by examiner

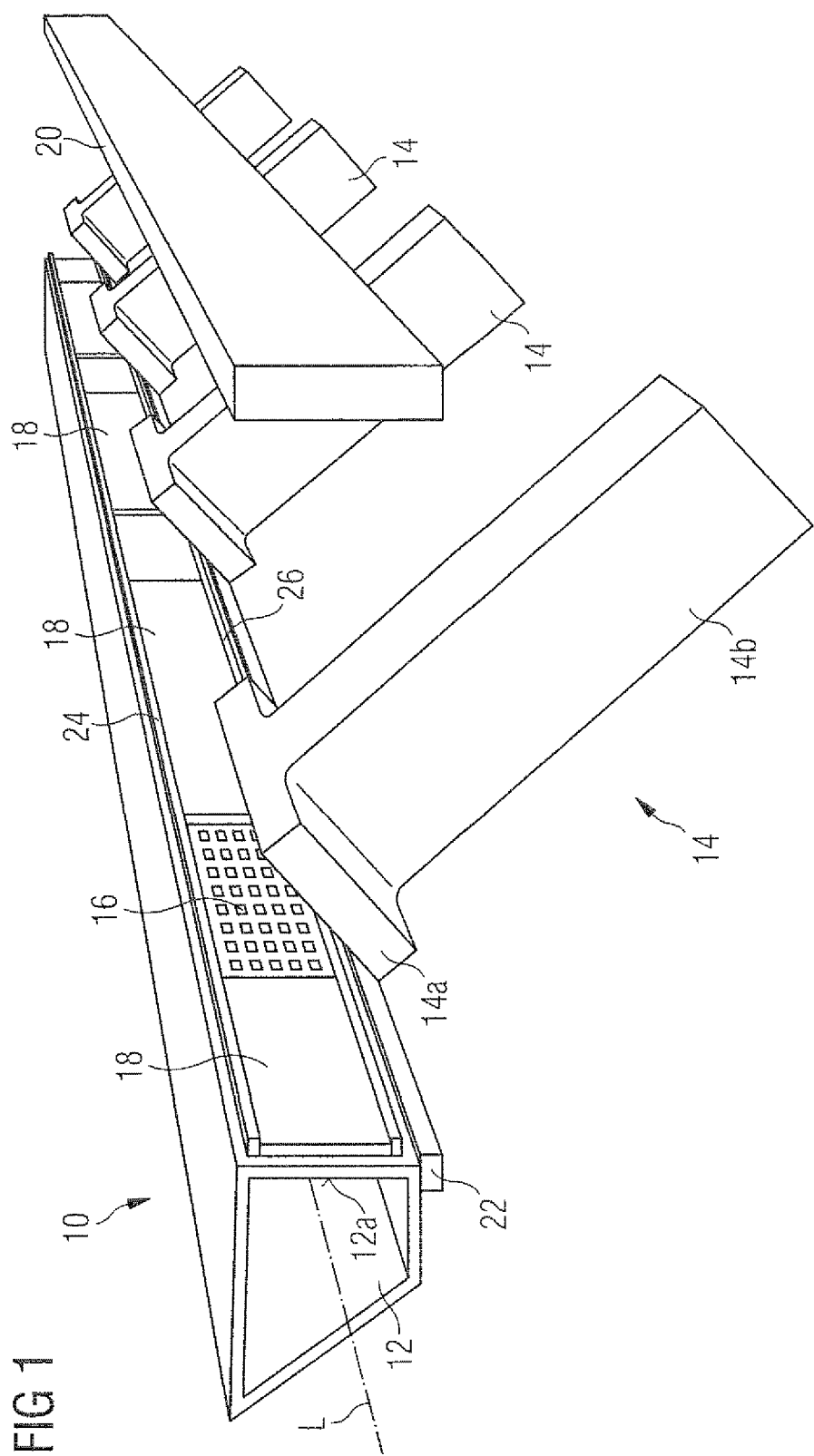

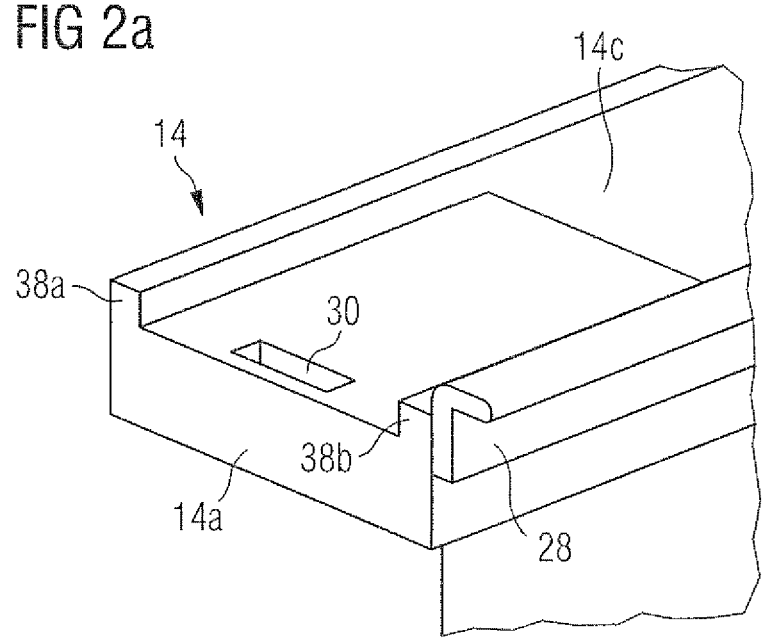
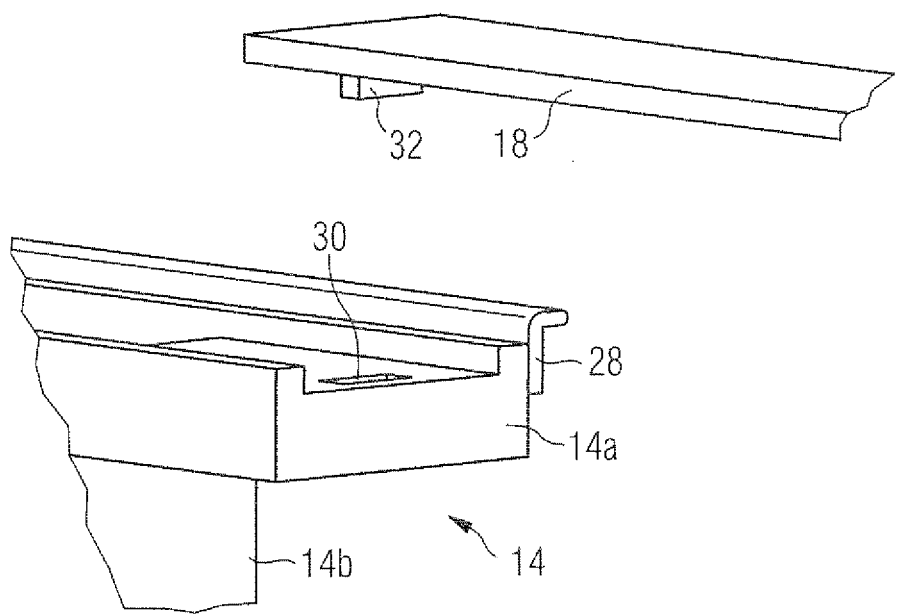

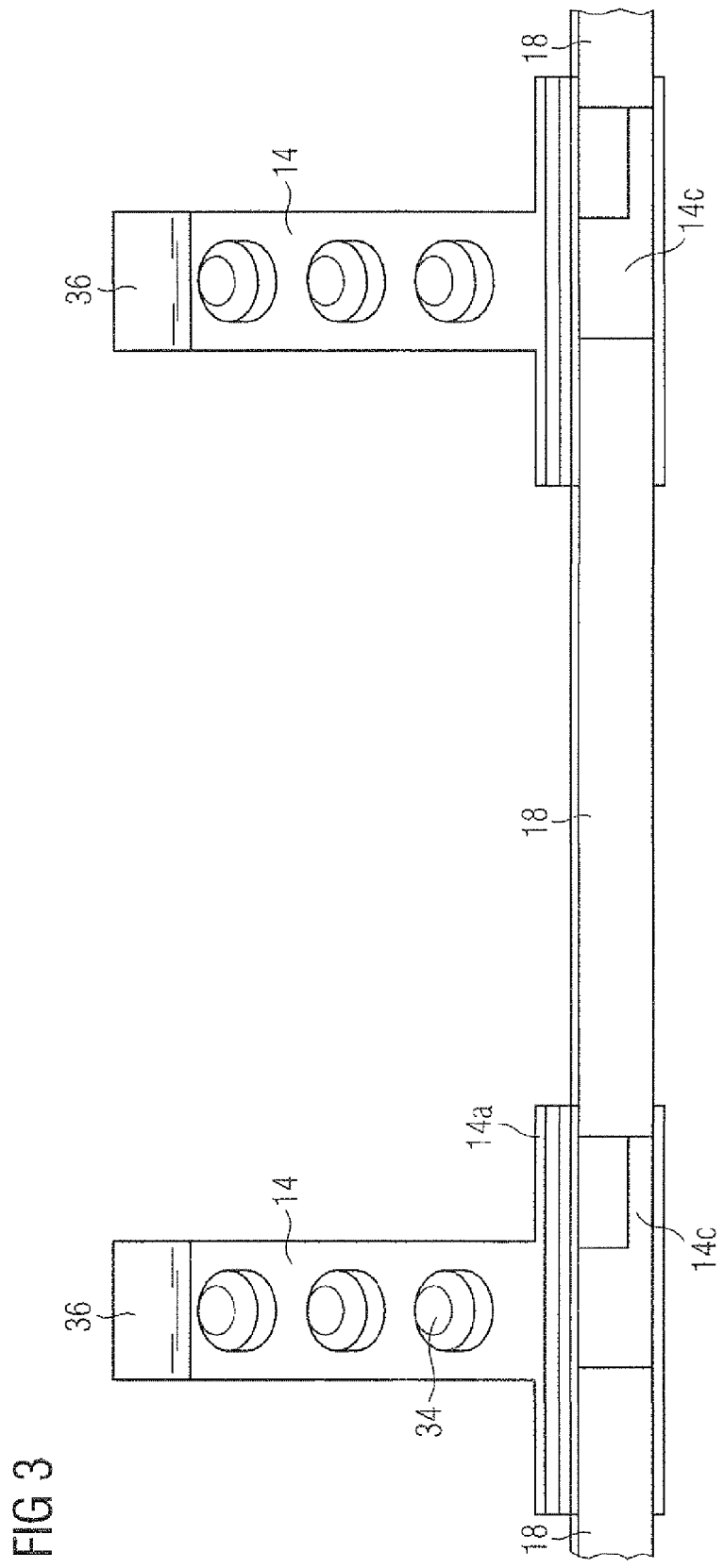

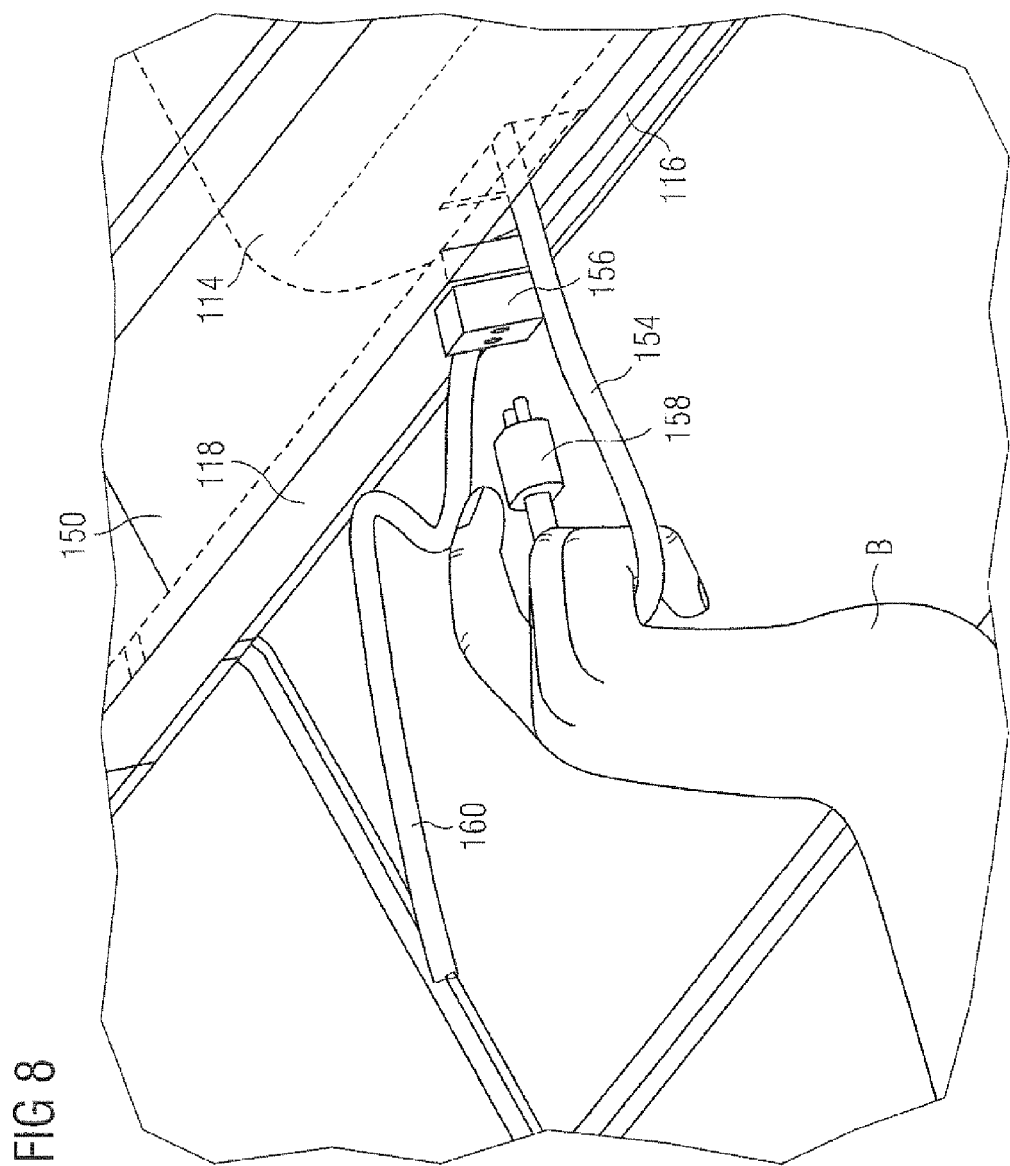

SUPPLY SYSTEM FOR SUPPLYING PASSENGERS IN A PASSENGER COMPARTMENT OF A VEHICLE

The invention relates to a supply system for supplying passengers in a passenger compartment of a vehicle, in particular an aircraft. Such a supply system has a supply line and a number of supply modules which, for supplying the passengers, are connectable to the supply line. The supply modules here may be a series of different convenience and control elements, such as for example air nozzles, reading lamps, stewardess call buttons, loudspeakers, oxygen masks and oxygen generators, and visual indicating elements. The supply line analogously comprises air, power and/or data line(s) which are connectable optionally via corresponding connections to the supply modules.

The supply system as such serves in a vehicle, such as for example an aircraft, a bus or a train, etc., to supply the passengers in the passenger compartments individually with, for example, air, light, information or the like, depending on which convenience and control elements are provided on the supply modules. Accordingly, in conventional supply systems the supply modules are provided at fixed positions above the seats and are generally arranged at a constant distance from one another.

However, in order to be able to cope with different use conditions, it is becoming increasingly important in vehicles, in particular aircraft, to be able to variably adjust the position of the seats and the distance between the seat rows inside the passenger compartment. In this context, an example that may be mentioned is a subsequent conversion of an aircraft in which a passenger compartment is to be completely or partly redesigned from the use for business class to the use for tourist class (reconfiguration of the seat layout). In order to enable such a reconfiguration, from practice there are known, for example, arrangements in which the seats can be displaced along rails in the direction of the vehicle longitudinal axis. In order to be able still to provide the aforementioned convenience and control functions for the individual passengers inside the passenger compartment, it is, however, also necessary to be able to displace the supply modules in accordance with the changed position of the seat rows.

Already known from the prior art are solutions in which the air showers of an air distribution system, which are arranged above the seats, are displaceable in the longitudinal direction of the vehicle. Thus, the document DE 10 2007 014 406 B3, for example, shows a supply channel with an air distribution system, having an elongated housing with a hollow profile extending in the longitudinal direction of the housing, and air shower rails. A circumferential surface of the hollow profile has a multiplicity of perforation openings, against which the air shower rails tightly bear with their air inlet, so that air can flow through the perforation opening out of the supply channel into the air shower rails. Those perforation openings which do not open into an air inlet of an air shower rail can be sealed by a stuck-on adhesive film.

The sticking-on of such an adhesive film is, however, cumbersome, time-consuming and costly. Furthermore, it is necessary on each reconfiguration of the passenger compartment to remove the attached adhesive film sections and, after repositioning of the air shower rails has been carried out, to adapt new adhesive films of corresponding length to the changed distances between the air shower rails and stick them on the perforation openings of the hollow profile.

Furthermore, the document DE 43 03 681 C1 shows an air line and an air shower which is connected thereto and is displaceable relative to and along the air line. The air line in this case consists of a straight dimensionally stable hollow profile with a longitudinal slot, the longitudinal slot being sealed by at least one sealing lip closed in the rest position as a result of a prestress. To withdraw the air, a slide guided in the longitudinal direction of the air line is provided with a withdrawing stub which projects into the interior of the hollow profile and is connected to the air shower. The slide has an outer guide and an inner guide, which are firmly connected to the withdrawing stub and are arranged at a mutual spacing such that they form an interspace that is matched to the sealing lips.

In such an embodiment, however, the integration into the lining of the passenger compartment has proved difficult. Furthermore, there is a risk of the elasticity of the sealing lip provided decreasing over time, with the result that the sealing function of the sealing lip can also be impaired. In such a case, some of the air guided inside the air line would leak out via a sealing lip which is no longer completely tight, with the result that the air flow guided into the air shower would be undesirably impaired.

The object on which the present invention is based, therefore, is to provide a supply system that enables a displacement of the supply modules inside the passenger compartment in a simple, quick and cost-saving manner and at the same time ensures a reliable connection of the supply modules to the supply line.

This object is achieved by a supply system having the features of Claim 1.

The supply system according to the invention has a supply line and a number of supply modules which, for supplying the passengers, are connectable to the supply line, the supply modules being displaceable relative to one another along the supply line. The supply line in this case has one or a plurality of supply openings, by which the connection between the supply line and the supply modules can be established. In this case, in order to enable a reconfiguration, more supply openings are provided than are necessary for the number of supply modules. Each supply module furthermore is assigned at least one screen which is arranged in such a manner on the supply line that it is displaceable along the supply line and can cover a part of the one supply opening or of the plurality of supply openings which is not used for the connection of a supply module to the supply line.

The supply openings in this case enable access to, for example, power and/or data lines and/or an air line routed in the supply line.

In the case where there is a single supply opening, which can be formed as a slot or groove for example, a part of this supply opening remains unused, i.e. it does not serve for the connection of a supply module to the supply line. Alternatively to this, a multiplicity of supply openings are provided, not all of which are used for the connection of the number of supply modules to the supply line. In both cases, the screen serves for covering the unused part of the supply lines so as to ensure that the interior of the supply line is protected from outside and is accessible via the supply openings only in case of need, i.e. when the screen is removed for example.

Each supply module is assigned such a screen which is displaceable along the supply line. If the supply modules are arranged, for example, one behind the other in the longitudinal direction along the supply line, one screen may be provided between two supply modules. In this way, each screen has two adjacent supply modules, one of which being assigned to it.

In one embodiment of the invention, each screen may be displaceable relative to at least one adjacent supply module.

This ensures that that the screens can be displaced not only, like the supply modules, along the supply line, but that also the distances between the supply modules can be varied independently of the screen arranged therebetween. In this case, it is conceivable that the screen is displaceable relative to both supply modules adjacent to the screen, i.e. not only to the assigned supply module but also to the further supply module adjacent to the screen. Alternatively, however, it is likewise conceivable that the screen is not relatively displaceable, for example, with respect to one of the two supply modules.

The displaceability of the screen relative to the supply module can be enabled, for example, by the screen being at least partly pushed into the supply module in the longitudinal direction of the supply line. Thus, for example, a lateral slot facing the screen can be provided on the supply module, into which slot the screen can be pushed in a little way or fully.

Alternatively, however, it can also be pushed in between the supply line and the respective supply module. Accordingly, it can be provided that each screen is arranged in a manner at least sectionally overlapping with at least one adjacent supply module. An overlapping arrangement of supply module and screen has the advantage that a reliable covering of the supply opening(s) by a screen and/or a supply module is ensured.

Such an overlapping arrangement of screen and supply module can be separated either by pulling the screen again in the opposite direction from the supply module or the interspace between the supply module. Instead, however, the screen may also be connected in the overlapping region to the supply module, so that a fixed assignment of a supply module and a screen is achieved. Such a coupling of screen and supply module can be implemented, for example, by a recess and a corresponding projection engaging in the recess, the projection being able to be arranged in the overlapping region on the screen or on the supply module, while the recess is arranged on the respective other element in the overlapping region. Alternatively, however, the supply module and the screen assigned to it may also be formed integrally with one another. Such an arrangement has, for example, the advantage that the number of movable parts and hence also the number of parts to be mounted can be reduced.

In a development of the invention, it may furthermore be provided that each supply module has a projection which is designed to limit the displacement of at least one adjacent screen along the supply line. Thus, for example, a supply module can ensure, by means of the projection, that a screen displaceable relative to it by being pushed in between the supply line and the supply module does not break the connection of supply module and supply line.

Likewise, a projection can serve to limit a pulling-out movement of the screen from the overlapping region, so as to ensure that the screen and the supply module have a fixed minimum overlapping region. Thus, such a projection serves primarily to block the displacement direction of an adjacent screen in a single direction.

Alternatively, however, a projection may also be used to fix a screen to a supply module, as already stated above. The projection may, of course, also be arranged on the screen and in the same manner limit the displacement of the screen with respect to an adjacent supply module at least in one direction.

Furthermore, it may be provided that the supply system has at least one guide arrangement for guiding the supply modules along the supply line. In this case, a wide variety of design variants of a guide arrangement are conceivable, for example a groove running in the longitudinal direction of the supply line and cooperating with a projection engaging in the groove, the groove or the projection being arranged on the supply modules; a suspension of the supply module on the supply line, the supply line itself acting as a guide rail for the supply modules; and the like.

A further development of the invention may provide that the supply line comprises a hollow profile for conducting air, which profile has a circumferential surface with air outlet openings, and that each supply module has at least one connecting opening for fluidic connection to at least one air outlet opening of the hollow profile. In this variant, the supply line serves not only for receiving, for example, other lines, such as power and data lines, but it itself additionally or alternatively forms the air line.

To discharge the air guided therein, the hollow profile of the supply line has on its circumferential surface air outlet openings, through which the air can pass outwards. The hollow profile may in this case have a wide variety of shapes, seen in cross-section, for example a round, oval or angular shape. In practice, a cross-section that has proved to be particularly advantageous is one having at least one straight-running side, so that the hollow profile provides a plane surface, thereby facilitating a connection of the supply modules to the hollow profile. Preferably, the circumferential surface has the air outlet openings on this plane surface, so that a targeted discharge of the air guided inside the hollow profile in the direction of the supply modules is achieved.

However, it is of course also possible to enable a connection of the supply modules to a curved circumferential surface of the hollow profile.

For the fluidic connection of the supply modules to the supply line, it is already sufficient if the supply modules bear with their connecting opening in a fluid-sealing manner against the region of the circumferential surface in which the air outlet openings are arranged. The supply modules may also be arranged with the connecting opening at a certain distance from the air outlet openings of the hollow profile if, for example, additional measures ensure that the air does not flow past the supply module, but flows through the connecting opening into the supply module. For example, the supply modules may still be sealed at the top and bottom in their installed state via sealing edges running in the direction of the longitudinal axis of the supply line, while laterally (in their installed state) they are sealed by the screens. Such sealing edges may be formed or arranged both on a connecting section of the supply modules and on the corresponding surface of the supply line. Furthermore, the screens may be of air-sealing design, being arranged preferably laterally adjoining the supply modules and the sealing edges (in abutting relationship) or in overlapping position with the supply modules, so that they form together with the sealing edges a kind of air duct between the circumferential surface of the hollow profile and the connecting opening of the respective supply module.

Furthermore, the screens owing to their air-sealing design can airtightly seal those air outlet openings of the hollow profile which are not arranged opposite an air outlet opening of a supply module. In order to be able to achieve the function of the airtight sealing, the screens may be produced partly or wholly of a sealing material, such as for example rubber, foam or the like, or provided therewith. For example, they may have rubber lips in their edge region or also be provided with a rubber coating in the region of their contact surface.

The air outlet openings of the hollow profile may form the supply openings of the supply line if the latter serves only for conducting air; alternatively, however, the air outlet openings may also form additional openings to the supply openings if, for example, it is provided that the supply line additionally has a data and/or power line, to which the supply modules are to be connected.

The air outlet openings may have different opening cross-sections and diameters, they may be arranged at uniform or non-uniform spacings on the circumferential surface, they may be formed in the manner of a perforation with a multiplicity of air outlet openings or as individual air outlet openings. In practice, a continuous perforation along a plane surface of the circumferential surface has proved particularly advantageous, since this is simple to produce and ensures that the supply modules can be arranged at various distances from one another at any desired location on the supply line.

When designing the diameters and cross-sections of the individual air outlet openings of the perforation, the effects of these parameters on the flow behaviour of the air flowing through are to be taken into account. In passenger compartments, therefore, it should be ensured in particular that the air flowing through does not produce a disturbing whistling noise or the like and can flow into the supply modules at sufficiently high flow velocity.

A further aspect to be taken into account when designing and dimensioning the air outlet openings on the supply line is the strength of the supply line. Thus, depending on the installed situation of the supply line, it may be advantageous if the latter has an increased strength, in which case it may be advantageous not to design the perforation continuously, but to provide interruptions. The same applies to the diameter size and the cross-sections of the air outlet openings, which may be chosen such that a higher strength of the supply line is achieved.

In a development of the invention, it may be provided that the supply system furthermore has a cover extending in a longitudinal direction, with an outer surface facing away from the passenger compartment and with an inner surface facing the passenger compartment, the supply line being arranged on the outer surface of the cover and the supply modules being arranged on the inner surface of the cover, and the cover having one or a plurality of supply openings, by which the connection between the supply line and the supply modules can be established. The cover serves in particular for covering the supply line and providing in the passenger compartment an inner surface which merges "smoothly" into the rest of the lining of the passenger compartment, so that any risk of injury to the passengers through protruding edges or sharp-edged objects, for example in the event of an accident, are reduced to a minimum.

Such a lining is customary in aircraft passenger compartments. However, it is a major problem to provide a lining in which a supply system with displaceable supply modules can be integrated without the need for a large number of additional exchangeable lining elements or covers in order to match this lining to the changed distances between the supply modules. This is achieved in the present invention by the movable screens, which are likewise used to cover the supply line.

In a further development of the invention, the screens may be arranged on the inner side of the cover, i.e. on the side facing the passenger compartment. In this case, the screens may be designed such that they form a virtually smooth surface together with the cover. In this embodiment, it is particularly advantageous that on a displacement of the individual supply modules, they, as well as the screens, are displaceable from the passenger compartment, since both are arranged on the inner side of the cover. Thus, it is not necessary to remove part of the cover to get at the individual displaceable elements and move them in one or other longitudinal direction of the supply line.

Finally, the supply line may comprise a data and/or power line with interfaces, the supply modules being connectable to the interfaces by the supply opening(s).

Figure 5:
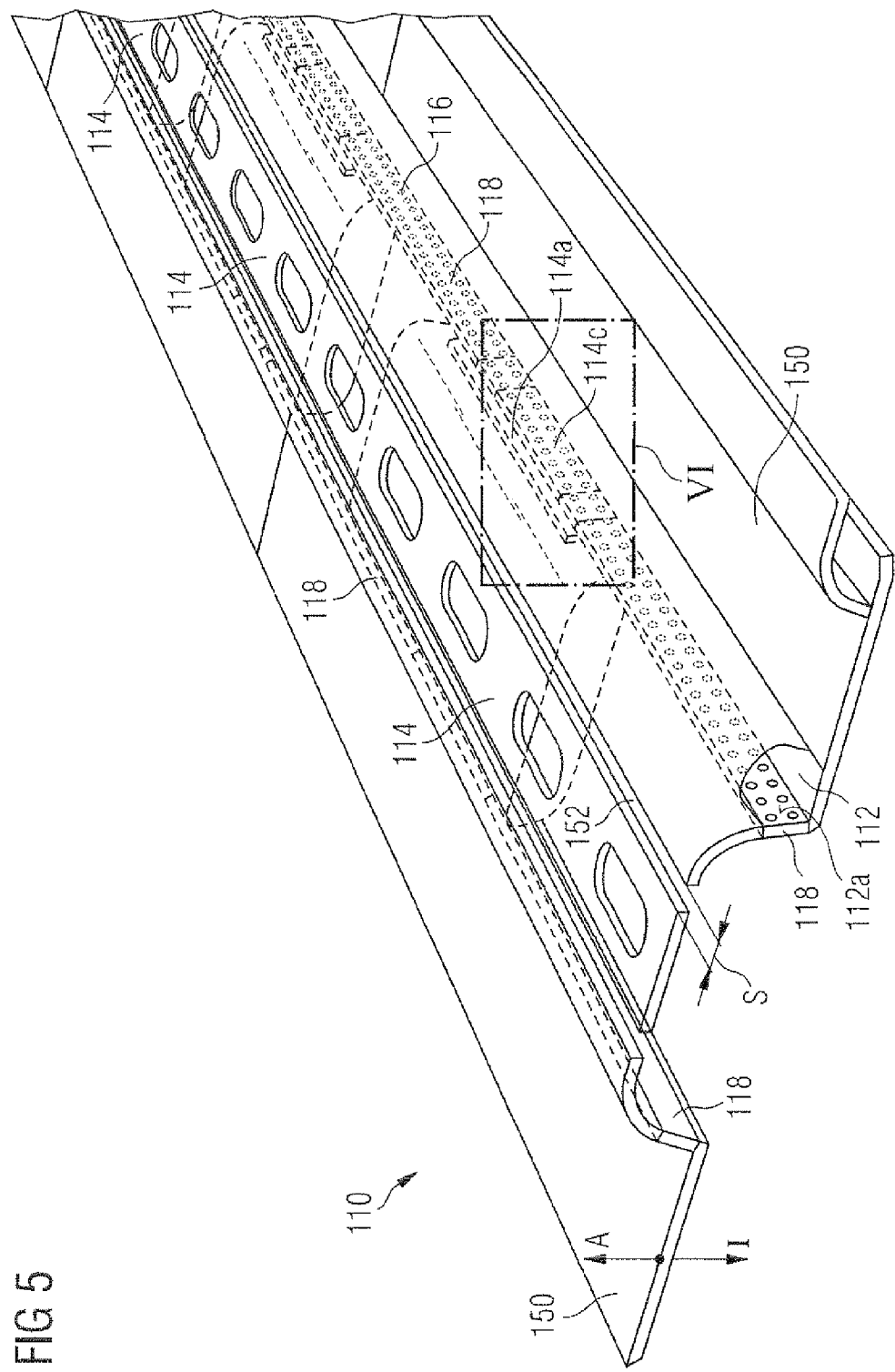
Figure 6:
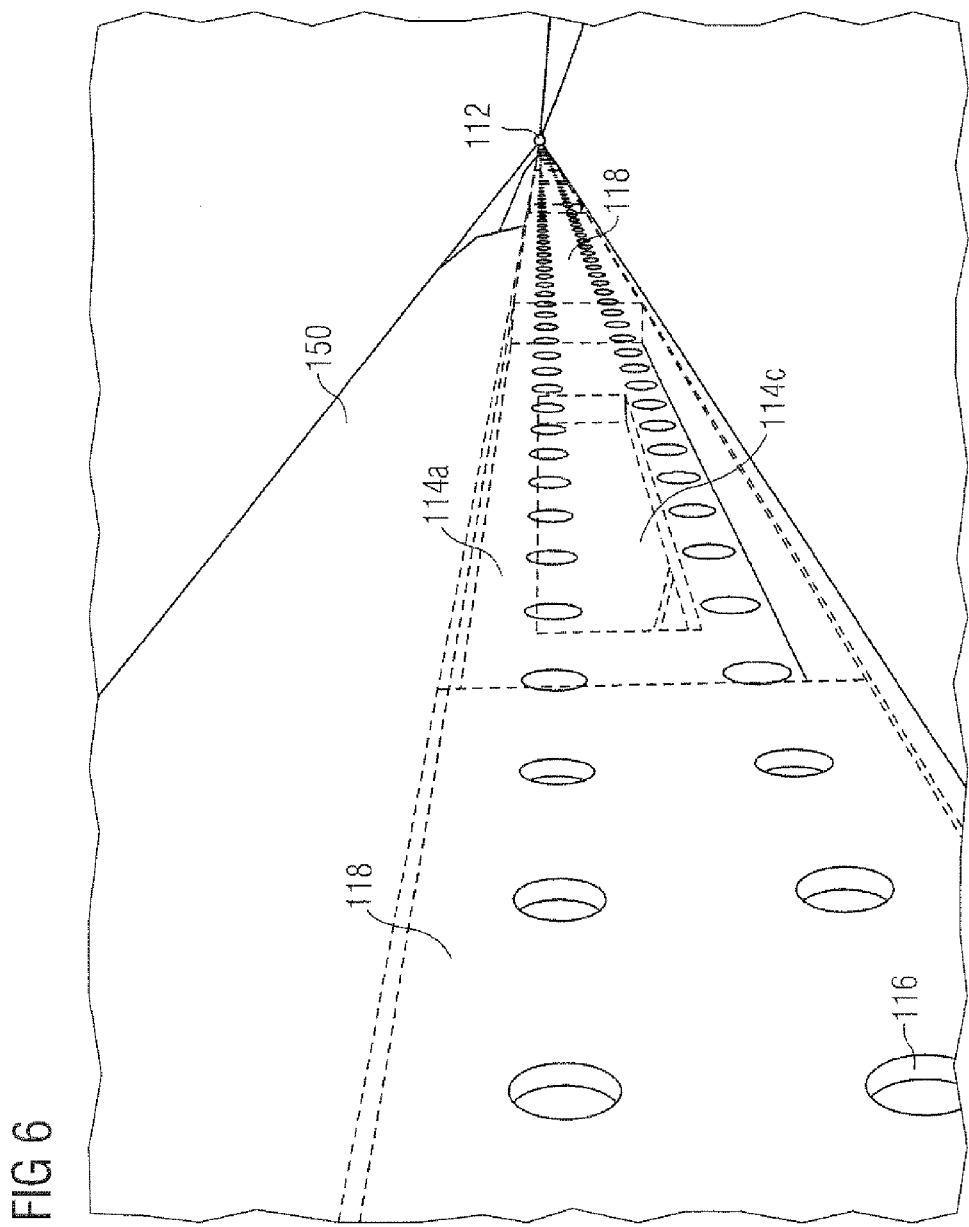
Figure 7:
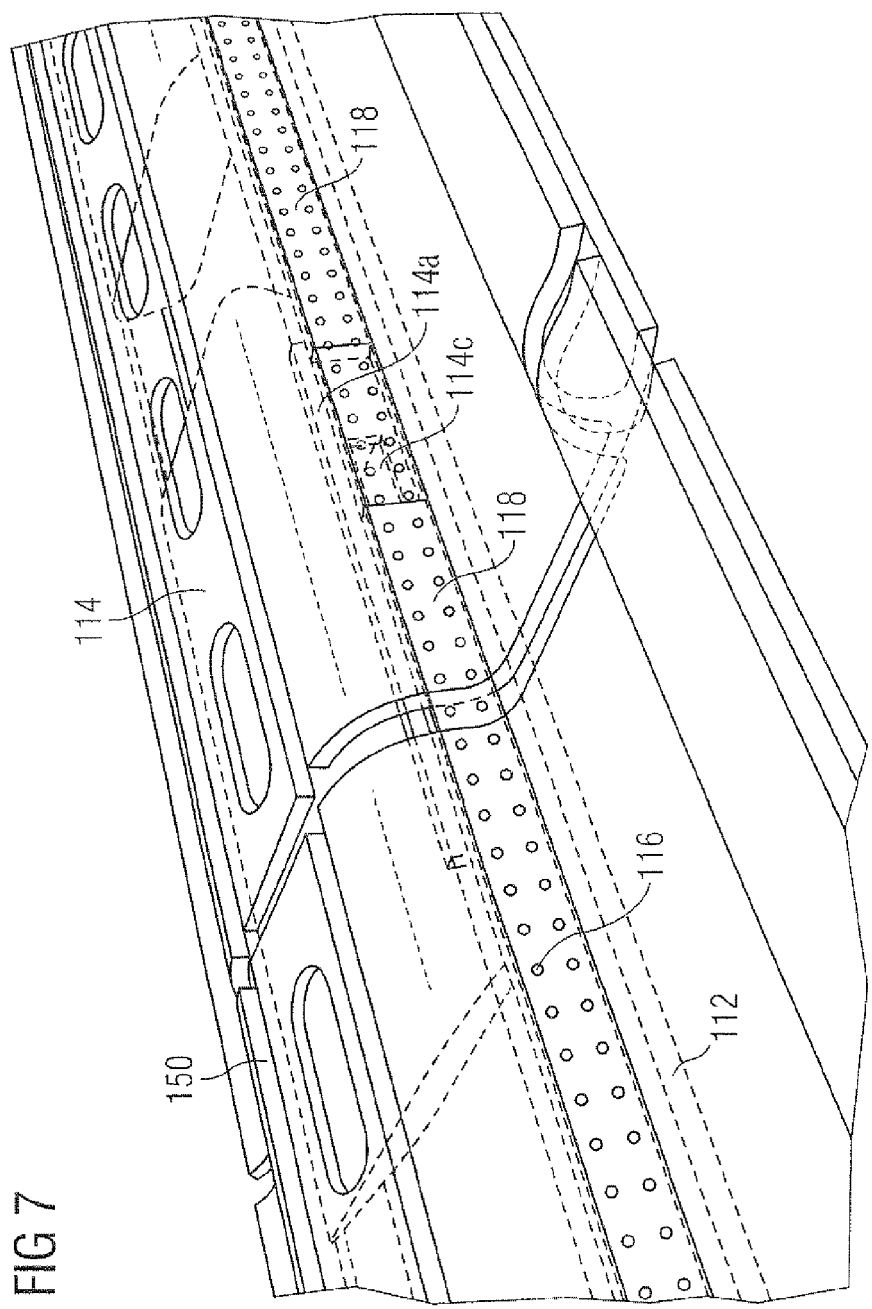

Preferred embodiments of the invention are explained below with reference to the appended schematic figures, in which:

FIG. 1 shows a schematic illustration of a supply system according to the invention, according to a first embodiment, FIGS. 2a and b show the connection of a screen to a supply module of a supply system according to the invention, according to FIG. 1, FIG. 3 shows a schematic illustration of the supply system according to the invention, according to FIG. 1, without the supply line, FIG. 4 shows an isometric view of a supply system according to the invention, according to FIG. 1, in the installed state, FIG. 5 shows an isometric view of a second embodiment of a supply system according to the invention, FIG. 6 shows an enlarged view of the detail VI of FIG. 5, FIG. 7 shows a detail view of a supply module with a changed screen position of the supply system according to FIG. 5, and FIG. 8 shows a schematic detail view of an alternative embodiment of the supply line of a supply system according to the invention, of FIG. 5.

FIG. 1 shows in a schematic illustration a first embodiment of a supply system, which is provided with the reference symbol 10 below. The supply system 10 comprises a supply line 12, to which several supply modules 14 can be connected. The supply line 12 is illustrated in FIGS. 1 to 4, relating to the first embodiment, as a hollow profile with a quadrangular cross-section. A plane surface 12a of the hollow profile of the supply line 12, which faces the supply modules 14 to be connected to it, has as supply openings 16 a continuous or sectionally provided perforation 16. In FIG. 1, this perforation 16 is illustrated merely by way of example on one connecting section.

A continuous perforation of the surface 12a may have the advantage over individual perforation sections that the supply modules 14 can be displaced with complete freedom along the longitudinal axis L of the supply line 12. Furthermore, the weight of the supply line 12 is reduced by a continuous perforation on the surface 12a compared with a sectionally provided perforation, and this may be advantageous. However, from other points of view, perforation sections arranged at a distance from one another are also advantageous, since in this case the strength of the hollow profile of the supply line 12 is improved compared with a supply line with continuous perforation and a sealing of the supply openings 16 of the perforation which are not connected to a supply module 14 is simplified.

To seal those supply openings 16 which are not used for connection to a supply module 14, there are furthermore provided screens 18 which are arranged displaceably on the supply line 12 along the longitudinal axis L thereof. The screens 18 are in this case formed as simple rectangular covering plates which are guided along the supply line 12. In order to achieve an improved sealing of the supply openings 16 with the aid of the screens 18, the screens 18 can be provided, in the contact region with the supply line 12, with a sealing material, for example in the form of sealing lips, a sealing coating or the like, so as to ensure that an airtight sealing is achieved with the aid of the screens 18. Alternatively, the screens 18 may also be produced entirely from a sealing material, for example rubber, foam or the like.

In their embodiment illustrated in FIGS. 1 to 4, the supply modules 14 have, merely schematically illustrated, air showers 34 (cf. e.g. FIG. 4) which are arranged on the (in the mounted state of the supply module 14) "lower" side of a supply section 14*b* of the supply module 14. Each supply module 14 furthermore has a connecting section 14*a* which is connected to the supply section 14*b* and for connection to the supply line 12 is brought into contact with the plane surface 12*a* of the supply line 12. The connecting section 14*a* has a connecting opening 14*c* which extends from the connecting section 14*a* into the supply section 14*b*, for the purpose of supplying the air showers 34.

In the region of their connecting section 14*a*, the supply modules 14 furthermore have a connecting lip 28 which cooperates with a connecting rail 22 on the supply line 12 and connects the supply modules 14 to the supply line 12. For fastening the supply modules 14, it is possible furthermore, as shown in FIGS. 1 and 4, to use a conventional fastening rail 20, into which a fastening element 36 arranged at the free end of the supply section 14*b* of the supply module 14 is latched. Via the connecting rail 22 and the fastening rail 20, the supply modules 14 are, additionally, securely guided along the supply line 12. Instead of the illustrated connection and fastening of the supply modules 14 to the supply line 12, other solutions are, of course, also conceivable: For example, connecting rails between which the supply modules are guided could be provided on the supply line, the supply modules could partially encompass the supply line, the supply modules could be guided on a separate rails at a defined distance from the supply line, and the like. Many such connections and fastening mechanisms are already known from the prior art, and will thus not be discussed in more detail here.

The screens 18 are likewise guided via guide rails 24 and 26 along the supply line 12. As can be seen more clearly in FIG. 3, the screens 18 can be displaced both relative to the supply line 12 and to the supply modules 14. In this way, the supply modules 14 in the region of their connecting section 14*a* can be brought into overlapping relationship with the screens 18, the screens 18 being pushed between the supply modules 14 and the supply line 12.

Provision may be made for the supply modules 14 to have in the region of their connecting section 14*a* a projection which limits the relative movement of one of the adjacent screens 18 in one direction, in order to ensure that the connecting opening 14*c* of the supply module 14 is not completely covered by a screen. Such a projection may, for this purpose, project from the connecting section 14*a* in the direction towards the supply line, so that the distance between the projection and the facing surface 12*a* of the supply line 12 is no longer sufficient to allow a screen 18 to be pushed therebetween.

Furthermore, it may be advantageous to couple an adjacent screen 18 with a supply module 14 in each case, so that they do not move relative to one another, but together with one another. This is achieved, for example, by a coupling shown in FIGS. 2*a* and 2*b*, in which the supply module 14 is provided on its connecting section 14 with a recess 30 which is designed to receive a corresponding projection 32 on the screen 18 to be coupled. When the projection 32 is received in the recess 30, the screen can no longer move relative to the coupled supply module 14. A relative movement to the next adjacent supply module is, however, still possible. Such a coupling makes it possible to ensure that each supply module is (airtightly) bounded by a screen 18 at least on one side of its connecting section 14*a*.

As can furthermore be clearly seen in FIGS. 2*a* and 2*b*, in the connecting region 14*a* of the supply modules 14, an (in the installed state) "upper" attaching projection 38*a* and a "lower" attaching projection 38*b* are formed, which projections can bear against the supply line 12 and thus likewise provide an as far as possible airtight boundary in the upper and lower region of the connecting section 14*a* of the supply module 14. Alternatively, the guide rails 24 and 26 may also serve to produce a sealing contact with the connecting section 14*a* of the connected supply module 14, so that the supply module 14 is sealed at the (in the installed state) "upper" and "lower" edges of the connecting section 14*a*.

FIG. 4, lastly, shows the installed state of a supply system 10 according to the invention, in which the supply line 12 and the fastening rail 20 are fastened to a storage compartment 40 in the upper region of the passenger compartment. Such storage compartments are of lightweight design, in particular for passenger compartments in aircraft, and for this reason often do not have—without additional stiffening—the necessary stiffness to prevent a deformation of the underside by heavy items of luggage. Therefore, in this embodiment, it is particularly advantageous that both the supply line 12 as a dimensionally stable hollow profile and the fastening rail 20 are arranged on the underside of such a storage compartment 40 and thus additionally stiffen the latter.

An air supply or other supply of, for example, cables into the supply line 12 can be effected between the individual storage compartments 40 via a corresponding recess 42. This has the advantage that a simpler and more space-saving supply of air and/or power or data cables can be effected than was hitherto the case, since this supply does not require an additional covering.

FIGS. 5 to 7 illustrate a second embodiment of the supply system according to the invention, the same reference symbols, but prefixed by the numeral "1", being used for the same elements.

The supply system 110 has, additionally to the embodiment shown in FIGS. 1 to 4, a cover 150, the latter spatially separating the supply modules 114 from the supply line 112. In the second embodiment, the supply line 112 is illustrated as a hollow profile with an approximately circular cross-section having two flattened sides for bearing against the cover 150. Additionally, a continuous perforation 116 is provided on a first flattened side 112*a*.

The cover 150 has an inner side I facing the passenger compartment and an outer side A facing away from the passenger compartment. The supply line 112 is arranged on the outer side A, while the supply modules 114 are arranged on the inner side I. In a central region, the cover 150 is furthermore curved in the direction towards its outer side A and thus forms a channel, in which the supply modules 114 can be space-savingly accommodated. The cover 150 can additionally be formed, on its inner side I, with guide rails and the like which enable a guidance of the screens 118 and also the supply modules 114 along the supply line 112. Thus, for example, a gap S can be provided, which serves as a guide groove for a corresponding projection (not illustrated) on the supply modules 114.

As shown in FIG. 8, the supply modules 114 can be designed not only for supplying the passengers in the passenger compartment with air, but also comprise control and convenience elements, such as for example reading lamps, information indicators, loudspeakers for an entertainment system and the like. These elements are supplied via power and/or data cables 154 which, for connection of the supply module to the supply line, can be connected by means of an interface 156, for example by a plug 158 which is plugged into the interface 156 formed as a socket. The interface 156 can be arranged, for example, on the rear side of one of the screens 118, thereby ensuring that the necessary cable length of the connection 154 remains approximately the same, since the screen 118 can move substantially together with the respective supply module 114.

The interface 156 is connected to a power or data source (not illustrated) via a power or data line 160. This data line 160 can be routed via the supply line 112. Alternatively to an embodiment with plug contacts, it is also possible, in the case of a desired power transmission, to achieve a current contact via a current collector which is arranged on the supply module and is kept in conductive contact (e.g. as a sliding or spring contact) with the supply line. In such a case, the screens 118 could act as insulators in order to avoid any danger to the passengers in the passenger compartment of electric shock.

The supply system according to the invention enables, through its displaceable supply modules, a simple and quick reconfiguration of the seat layout in the passenger compartment, in which the supply modules can be adapted to changed positions of the seat rows in the passenger compartment without great difficulties. Furthermore, the provision of additional, likewise displaceable, screens enables a continuous lining of the passenger compartment, which is advantageous particularly from the point of view of safety, since the risk of injury of the passengers is thereby reduced. In contrast to customary linings, the screens are likewise displaceable, so that they can be simply displaced as well during a reconfiguration.

The invention claimed is:

1. A supply system for supplying passengers in a passenger compartment of a vehicle, in particular an aircraft, having:
   a supply line; and
   a number of supply modules which, for supplying utilities to the passengers, are connectable to the supply line,
   the supply modules being displaceable relative to one another along the supply line,
   the supply line having one or a plurality of supply openings, by which the connection between the supply line and the supply modules can be established,
   each supply module furthermore being assigned at least one screen which is arranged on the supply line such that the at least one screen is longitudinally displaceable relative to the supply module and the supply line to operate to cover a part of the one supply opening or of the plurality of supply openings which is not used for the connection of a supply module to the supply line.

2. The supply system according to claim 1,
   each screen being longitudinally displaceable relative to at least one adjacent supply module.

3. The supply system according to claim 1,
   each screen being arranged in a manner at least sectionally overlapping with at least one adjacent supply module.

4. The supply system according to claim 1,
   each supply module having a projection which is structured to limit the longitudinal displacement of at least one adjacent screen along the supply line.

5. The supply system according to claim 1,
   which has at least one guide arrangement for guiding the supply modules along the supply line.

6. The supply system according to claim 1,
   the supply line comprising a hollow profile for conducting air, which profile has a circumferential surface with air outlet openings, and each supply module having at least one connecting opening for fluidic connection to at least one air outlet opening of the hollow profile.

7. The supply system according to claim 6,
   the screens being of air-sealing design.

8. The supply system according to claim 1,
   further comprising a cover extending in a longitudinal direction, with an outer surface facing away from the passenger compartment and with an inner surface facing the passenger compartment, the supply line being arranged on the outer surface of the cover and the supply module being arranged on the inner surface of the cover, and the cover having one or a plurality of supply openings, by which the connection between the supply line and the supply modules can be established.

9. The supply system according to claim 8,
   the screens being arranged on the inner side of the cover.

10. The supply system according to claim 1,
    the supply line comprising a data and/or power line with interfaces, and the supply modules being connectable to the interfaces by the one or plurality of supply openings.

11. The supply system according to claim 9, wherein the inner side of the cover comprises guide rails, and wherein the screens are guided via the guide rails along the supply line.

12. The supply system according to claim 1, wherein the at least one screen is guided via guide rails along the supply line.

13. A supply system according to claim 1, wherein the at least one screen is moveable relative to the supply line substantially together with at least one adjacent supply module.

* * * * *